United States Patent [19]

Frederiksen et al.

[11] Patent Number: 5,070,617

[45] Date of Patent: Dec. 10, 1991

[54] HAND CRACKER FOR NUTS

[76] Inventors: Wilfred C. Frederiksen, 16881 Bolero Ln., Huntington Beach, Calif. 92649; Sun Y. Kim, 2384 Lancaster Ct., Hayward, Calif. 94542

[21] Appl. No.: 612,865

[22] Filed: Nov. 13, 1990

[51] Int. Cl.$^5$ ............................ A23N 5/00; A47J 43/26
[52] U.S. Cl. ...................................... 30/120.2; 99/574; 99/581
[58] Field of Search .......... 99/568, 571, 572, 574–576, 99/579, 581, 582; 30/120.1, 120.2, 120.3, 120.4, 120.5

[56] References Cited

U.S. PATENT DOCUMENTS

| | | | |
|---|---|---|---|
| 706,179 | 8/1902 | Hordish | 30/120.2 |
| 1,094,698 | 4/1914 | Bostrom | 30/120.2 |
| 1,194,318 | 8/1916 | Power | 99/575 |
| 1,289,351 | 12/1918 | Abt | 99/581 |
| 2,590,953 | 4/1952 | Gendler | 30/120.2 |
| 2,799,312 | 7/1957 | Ervin | 99/575 |
| 3,965,810 | 6/1976 | Miller | 99/581 |
| 4,793,248 | 12/1988 | Frederiksen et al. | 99/576 |
| 4,909,140 | 3/1990 | Burlock et al. | 99/574 |

FOREIGN PATENT DOCUMENTS 0217190 4/1987 European Pat. Off. ............ 30/120.2

*Primary Examiner*—Timothy F. Simone
*Attorney, Agent, or Firm*—Bielen, Peterson & Lampe

[57] ABSTRACT

A hand cracker for nuts, particularly thick shelled macadamia nuts, the cracker having a receptacle with a bottom and a side wall for receiving a nut to be cracked with an off-center cracking shaft with wedge blades arranged circumferentially around the shaft and a crank device to rotate the shaft and wedge the nut between the wedge blades of the shaft and the wall of the receptacle wherein the nut is cracked by the force of the wedge action of the wedge blades.

7 Claims, 1 Drawing Sheet

HAND CRACKER FOR NUTS

BACKGROUND OF THE INVENTION.

This invention relates to a nut cracking device and in particular to a device that cracks hard shell nuts such as macadamia nuts and filberts, utilizing the novel splitting technique described in our U.S. Pat. No. 4,793,248, issued Dec. 27, 1988, entitled, *Nut Shelling Machine*. In the referenced patent, there was described an automated shelling machine for splitting the shells of hard shell nuts, particularly macadamia nuts which have a smooth, hard, round shell.

Conventional devices that employ impact or high compression forces typically shatter the shell and damage the kernel. Furthermore, when a brittle shell of a nut of this type shatters, there are many small pieces of shell that must be separated from the meat, much of which may be broken. Since it is always desirable to crack the shell from a nut leaving the kernel whole, the design of the nut shelling machine of the referenced patent utilizes a technique where a specially designed blade on a roller cuts into the thick outer shell of the macadamia nut and splits the shell, generally in two pieces. In the preferred embodiment of the referenced shelling machine the nut is entrapped between rollers where opposed blades engage the nut. This type of complex machine, while suitable for factory shelling of nuts is not suitable for hand cracking of nuts where the complexity and expense of the device must be kept at a minimum.

In the embodiments of the hand cracking device of this invention, the principal of splitting a nut with a shear or wedge action as opposed to impact or compression cracking is utilized in a modified form. The cracking mechanism in the hand cracking device is again of a shell splitting type and utilizes a unique blade mechanism that is common to several different embodiments of the invention that may be designed to appeal to the ultimate user.

SUMMARY OF THE INVENTION

The hand cracking device for nuts of this invention utilizes the splitting technique of a specially configured blade that engages a trapped nut, cuts the surface and by a wedging action splits the shell into generally two major pieces. The device constructed to incorporate this splitting mechanism is designed to operate on macadamia nuts in particular and with replacement of certain sized liners can crack other common nuts of round configuration with hard shells. In the preferred embodiment of this invention the nuts are singularly placed in a receiving bowl or receptacle having an off-center central shaft with a series of longitudinal splitting blades circumferentially arranged around the shaft. A cover retains the nut in the bowl and provides a journal bearing for the shaft. The shaft is connected to a crank mechanism for rotating the shaft when the nut is engaged between the shaft and the wall of the bowl. The off-center placement of the shaft with respect to the recess of the circular bowl enables a nut to be freely deposited in the bowl in one sector, but on rotation of the shaft, causes the nut to become wedged firmly between the shaft and the wall of the bowl in another sector.

In order the provide the proper non-sliding contact of the nut against the wall of the bowl to enable the blade to engage the nut with a wedging action, the wall of the bowl is lined with an abrasive material. The annular liner can be made of assorted thicknesses to accommodate nuts of different size.

The range of nut sizes that can be cracked by the hand cracking device of this invention without change of the liner can be increased by configuring the inside wall of the bowl in a spiral or logarithmic curve instead of circular.

These preferred embodiments of the hand cracker for nuts are shown in the drawings and are described in greater detail in the specification description that follows.

DETAILED DESCRIPTION OF THE PREFERRED EMBODIMENTS

Figure 2:
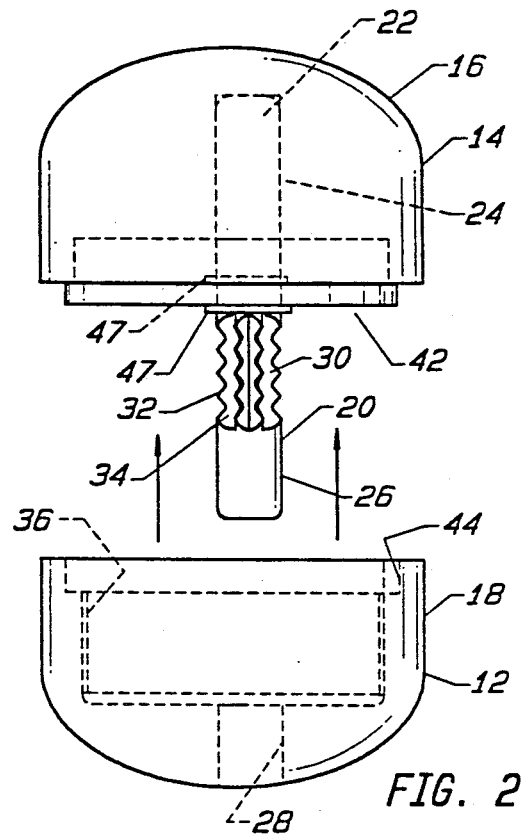
FIG. 2 is an exploded side elevational view of the hand cracker of FIG. 1.

Referring to FIG. the hand cracker for nuts, designated generally by the reference numeral 10 is shown partially in cross section to illustrate the arrangement of the internal parts when the cracker is closed for the cracking operation. The hand cracker 10 is a two-component unit with a receptacle component 12 and a hand crank component 14. The receptacle component and the crank component have an outer shell 16 and 18 that is sized for convenient gripping by a user's hands to enable one component to be twisted with respect to the other component. As shown in FIG. 2, the two components separate easily and are interconnected and aligned by a cracker shaft 20 having one end 22 that is fixed in a bore or 24 in the hand crank component 14, and an opposite end 26 that is receivable in a similar bore 28 in the receptacle component 12 that functions as a journal bearing. A central portion 30 of the cracker shaft 20 includes a series of teeth 32 on a plurality of splines 34 circumferentially arranged around the shaft 20 as shown in greater detail in FIG. 3.

Figure 3:
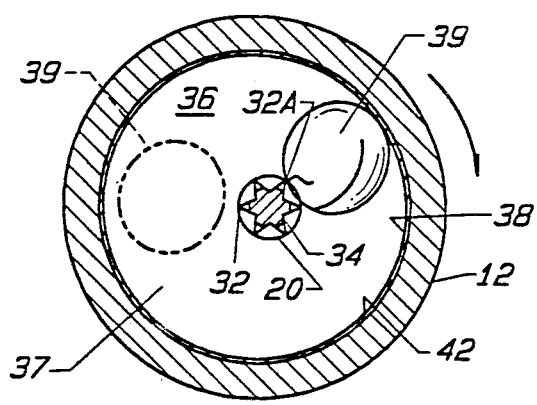
FIG. 3 is a cross sectional view taken on the lines 33 and FIG. 1.

The receptacle component 12 has a receptacle or bowl 36 into which the nuts to be cracked are individually placed as shown in FIG. 3. The receptacle 36 has a bottom 37 and a cylindrical wall 38. The shaft 20 is eccentrically positioned in the receptacle component such that one sector of the receptacle 36, where the nut 39 shown in phantom in FIG. 3 is positioned, has a greater distance between shaft 20 and wall 38 than an opposite sector where the nut 39 is engaged between internal wall 38 of the receptacle and the teeth 32 on the shaft 20. In this engaged position the contacting tooth 32a contacts and penetrates the nut 38 with a wedging action as the hand crank component 14 is rotated in the relative direction indicated in FIG. 3. To prevent the nut from simply sliding against the inside wall of the receptacle 12 when engaged by the shaft's tooth 32a, the internal wall 38 includes a liner 42 of skid-resistant material such as a heavy grit impregnated fabric. Alternately, the liner may comprise a sleeve of knurled metal material or abrasive ceramic material. The liner 42 is replaceable and may be of varying thickness to adjust for nuts of greatly varying size.

Figure 4:
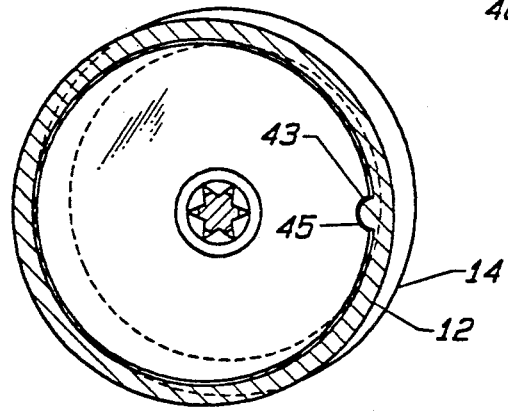
FIG. 4 is a cross sectional view taken on the lines 44 and FIG. 1.

To keep the nut in the bowl in position against the tooth portion 30 of the shaft 20 when the shaft is rotated by twisting of the hand crank component 14, the hand crank component 14 includes a cover plate 42 which seats in a recess 44 in the receptacle component. The shaft 20 is fixed in position in the bore 24 of the hand crank component. However, the plate 42 is free to rotate relative to the shaft and is oriented such that a notch 43 in the plate 42 engages a key projection 45 in the recess of the receptacle component 12 as shown in FIG. 4. The plate 42 provides a bearing surface to prevent any deformation of the shaft during the cracking process, which can involve substantial forces when cracking hard nuts of the macadamia variety. The plate is retained to the shaft 20 by C-clips 47.

Figure 5:
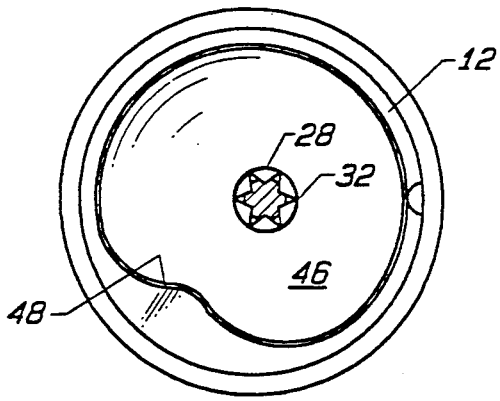
FIG. 5 is a top plan view of an alternate embodiment of the receptacle component of the hand cracker of FIG. 1.

To increase the range of sizes of nuts that can be cracked by the hand cracker without substitution of the liner, the receptacle 12 may have its chamber 46 configured in a cam shape as shown in FIG. 5. In the embodiment of FIG. 3, the cylindrical side wall of the receptacle is circular in cross section. In the embodiment of FIG. 5, the cylindrical side wall 48 is a closed curve in cross section having a cam-like configuration to increase the variation of the distance between the wall and shaft at different sectors in the receptacle. In this configuration, the minimal sector between the shaft 20 and the sector wall 48 is exaggerated such that upon engagement by the shaft teeth 32 even a smaller nut will be wedged between the shaft and receptacle wall and be subjected to the forces of cracking. The shaft is, in general, centrally positioned with a varying distance from shaft to wall as shown in FIG. 5. While the shaft may be off-center, the degree of eccentricity need not be as great as for a side wall of circular cross section.

Figures 6, 7:
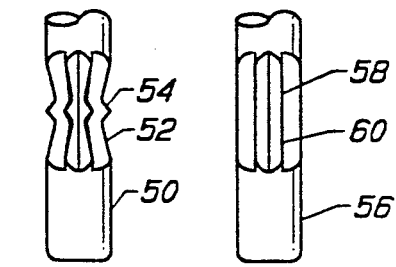
FIG. 6 is a partial side elevational view of an alternate embodiment of the cracker shaft for the hand cracker of FIG. 1.
FIG. 7 is a partial side elevational view of a further alternate embodiment of the cracker shaft for the hand cracker of FIG. 1.

Referring to FIG. 6, the hand cracker may include an alternately configured shaft such as the shaft 50 shown in FIG. 6. The shaft 50 includes a series of splines 52 arranged symmetrically around the shaft with each spline having a single tooth 54 that is centrally located. In addition, a shaft such as the shaft 56 in FIG. 7 may be utilized in which the splines 58 comprise blades with a sharp edge 60 without separate teeth thereon.

Figure 1:
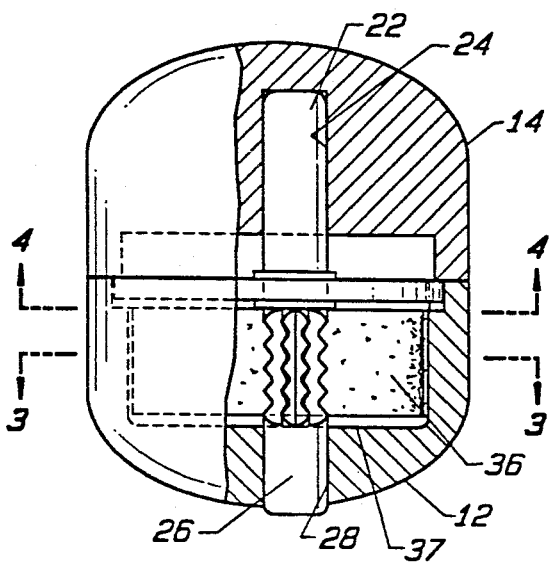
FIG. 1 is a side elevational view, partially in cross section, of the hand cracker of this invention.

During operation, the hand cracker is manually separated as shown in FIG. 2 and a nut placed into the bowl 36 of the receptacle component 12. The top hand crank component 14 is then coupled to the receptacle component by inserting the end 26 of the cracking shaft 20 into the journal bore 28 of the receptacle component 12. The plate 42 is aligned in the recess 44 with the notch 43 engaged by the key 45 such that the hand crank component and the receptacle component form a closed unit as shown in FIG. 1. By twisting the hand crank component 14 relative to the receptacle component 12 the nut becomes wedged between the wall of the receptacle and the toothed shaft. Upon further twisting of the hand crank component 14, the teeth on the shaft cut and penetrate the shell of the nut and wedge the shell apart as the shaft further rotates. Upon cracking of the nut, the two halves of the hand cracker can be separated and the nut and shells retrieved for respective consumption and disposal. Preferably, the receptacle component, hand crank component and plate are fabricated from plastic for minimizing cost and weight. The external configuration of the receptacle can be configured as desired and may be arbitrarily shaped, and, if desired, may be formed into the whimsical shape of a nut or other pleasing configuration. Alternately, the crank component can simply comprise a cross bar (not shown) connected to the shaft to twist the shaft.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A hand cracker for nuts comprising:
   a receptacle for receiving a nut to be cracked, the receptacle having a bottom and a substantially continuous cylindrical side wall with surface means for resisting slippage of a nut in contact with the wall,
   a cracking shaft with a portion of the shaft having wedge blades circumferentially arranged around the shaft,
   crank means for rotating the cracking shaft, wherein the cracking shaft has a shaft axis and is positionable for rotation in the receptacle with the side wall of the receptacle substantially parallel to the shaft axis, the distance between the wedge blades and the wall varying from greater than the diameter of a nut to be cracked to less than the diameter of a nut, wherein a nut placed in the receptacle on rotation of the cracking shaft is engaged between the wedge blades and receptacle wall and split by a wedge action of the blades.

2. The hand cracker of claim 1 wherein the cylindrical side wall is circular in cross section and the cracking shaft is eccentrically positioned relative to the circular side wall.

3. The hand cracker of claim 1 wherein the cylindrical side wall is a closed curve in cross section having a cam-like configuration with the cracking shaft centrally positioned with a varying distance from shaft to wall.

4. The hand cracker of claim 1 wherein the wedge blades of the cracking shaft each have at least one tooth thereon.

5. The hand cracker of claim 1 wherein the wedge blades of the cracking shaft each have a series of teeth.

6. The hand cracker of claim 1 wherein the crank means comprises a hand-grip sized shell with a cover plate rotably attached to the shaft, the receptacle having a recess in the side wall constructed to receive the cover plate and means to restrict rotation of the cover plate relative to the receptacle when the crank means is twisted.

7. The hand cracker of claim 6 wherein the means to restrict rotation of the cover plate comprises a key in the receptacle and a notch in the cover plate.

* * * * *